United States Patent
Yun et al.

(10) Patent No.: US 9,694,668 B1
(45) Date of Patent: Jul. 4, 2017

(54) COOLING MODULE

(71) Applicant: Hanon Systems, Daejeon (KR)

(72) Inventors: Shin-Won Yun, Daejeon (KR); Hyuk Kim, Daejeon (KR); Jae Yong Kim, Daejeon (KR); Young Chan Kim, Daejeon (KR); Jeong Wan Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/107,935

(22) PCT Filed: Sep. 4, 2015

(86) PCT No.: PCT/KR2015/009352
§ 371 (c)(1),
(2) Date: Jun. 24, 2016

(87) PCT Pub. No.: WO2016/036190
PCT Pub. Date: Mar. 10, 2016

(30) Foreign Application Priority Data

Sep. 5, 2014 (KR) .................. 10-2014-0118655

(51) Int. Cl.
| | | |
|---|---|---|
| *B60K 11/00* | (2006.01) | |
| *B60K 11/06* | (2006.01) | |
| *B60K 11/04* | (2006.01) | |
| *B60H 1/00* | (2006.01) | |
| *F01P 3/18* | (2006.01) | |

(52) U.S. Cl.
CPC ............. *B60K 11/06* (2013.01); *B60H 1/004* (2013.01); *B60K 11/04* (2013.01); *F01P 2003/182* (2013.01); *F01P 2003/185* (2013.01)

(58) Field of Classification Search
CPC .......... B60K 11/04; B60K 11/06; B60H 1/004
See application file for complete search history.

(56) References Cited

U.S. PATENT DOCUMENTS 5,046,554 A * 9/1991 Iwasaki .................. B60K 11/04
123/41.49
5,219,016 A * 6/1993 Bolton .................. B60H 1/3227
165/140

(Continued)

FOREIGN PATENT DOCUMENTS

| JP | 2004204793 A | 7/2004 |
|---|---|---|
| JP | 2005035476 A | 2/2005 |

(Continued)

*Primary Examiner* — Erez Gurari
(74) *Attorney, Agent, or Firm* — Shumaker Loop & Kendrick, LLP; James D. Miller (57) ABSTRACT

A cooling module is formed by stacking a condenser mounted in order to cool an engine of a vehicle and cool a refrigerant of an air conditioner, an electronic radiator disposed below the condenser, an engine radiator, and a fan shroud assembly and capable of improving cooling performance of the electronic radiator by forming the engine radiator in only a region in which the condenser is formed or forming the engine radiator in a portion of a region in which the electronic radiator is formed as well as the region in which the condenser is formed, in a height direction and including an air guide installed at a portion corresponding to the electronic radiator below the engine radiator to allow air to be introduced toward the electronic radiator.

14 Claims, 12 Drawing Sheets

(56) References Cited

U.S. PATENT DOCUMENTS

| | | | | |
|---|---|---|---|---|
| 5,269,367 A * | 12/1993 | Susa | | B60R 11/00 165/140 |
| 5,476,138 A * | 12/1995 | Iwasaki | | B60H 1/00321 165/41 |
| 6,029,345 A * | 2/2000 | Christensen | | B60K 11/04 165/140 |
| 6,059,019 A * | 5/2000 | Brost | | F01P 3/18 123/41.51 |
| 6,155,335 A * | 12/2000 | Acre | | F28F 9/002 123/41.56 |
| 6,364,403 B1 * | 4/2002 | Ozawa | | B60K 11/04 296/187.09 |
| 6,817,404 B2 * | 11/2004 | Frana-Guthrie | | F01P 3/18 165/43 |
| 7,128,178 B1 * | 10/2006 | Heinle | | B60K 11/04 165/41 |
| 7,637,309 B2 * | 12/2009 | Contet | | F28D 1/0435 165/153 |
| 2001/0054497 A1 * | 12/2001 | Kalbacher | | B60K 11/08 165/140 |
| 2003/0062148 A1 * | 4/2003 | Ohki | | B60K 11/04 165/41 |
| 2003/0062456 A1 * | 4/2003 | Nakagawa | | B60H 1/00464 248/200 |
| 2007/0144713 A1 * | 6/2007 | Sugimoto | | F28D 1/0452 165/140 |
| 2010/0025007 A1 * | 2/2010 | Fell | | F01P 3/18 165/44 |
| 2010/0163324 A1 * | 7/2010 | Jyoutaki | | B62D 25/084 180/68.1 |
| 2011/0120792 A1 * | 5/2011 | Carron | | B60K 11/04 180/68.1 |
| 2011/0127005 A1 * | 6/2011 | Keerl | | F01P 3/18 165/51 |
| 2011/0304176 A1 * | 12/2011 | Kihara | | B60K 11/04 296/193.09 |
| 2012/0024494 A1 * | 2/2012 | Grasso | | B60K 11/04 165/51 |
| 2014/0102679 A1 * | 4/2014 | Matsudaira | | B60K 11/04 165/143 |
| 2016/0001629 A1 * | 1/2016 | Rohr | | B60K 11/04 165/76 |
| 2016/0311311 A1 * | 10/2016 | Choi | | F25B 6/04 |
| 2016/0356557 A1 * | 12/2016 | Giordano | | B60K 11/04 |

FOREIGN PATENT DOCUMENTS

| | | |
|---|---|---|
| KR | 1020050100100 A | 10/2005 |
| KR | 1020110056598 A | 5/2011 |
| KR | 1020130074041 A | 7/2013 |

* cited by examiner

COOLING MODULE

CROSS-REFERENCE TO RELATED PATENT APPLICATIONS

This patent application is a United States national phase patent application based on PCT/KR2015/009352 filed Sep. 4, 2015, which claims the benefit of Korean Patent Application No. 10-2014-0118655 filed Sep. 5, 2014, the entire disclosures of which are hereby incorporated herein by reference.

TECHNICAL FIELD

The present invention relates to a cooling module, and more particularly, to a cooling module formed by stacking a condenser mounted in order to cool an engine of a vehicle and cool a refrigerant of an air conditioner, an electronic radiator disposed below the condenser, an engine radiator, and a fan shroud assembly and capable of improving cooling performance of the electronic radiator by including an air guide installed below the engine radiator to allow air to be introduced toward the electronic radiator.

BACKGROUND ART

Generally, a cooling module is mounted at a front end module carrier of the front of a vehicle in order to cool an engine of the vehicle and cool a refrigerant of an air conditioner, and has a structure in which a condenser and a radiator are stacked in parallel with each other in a state in which they are spaced apart from each other by a predetermined distance and a fan shroud assembly is formed on one surface of the radiator to generate heat exchange in the condenser and the radiator by a flow of air or driving of a cooling fan at the time of movement of the vehicle.

Figure 1:
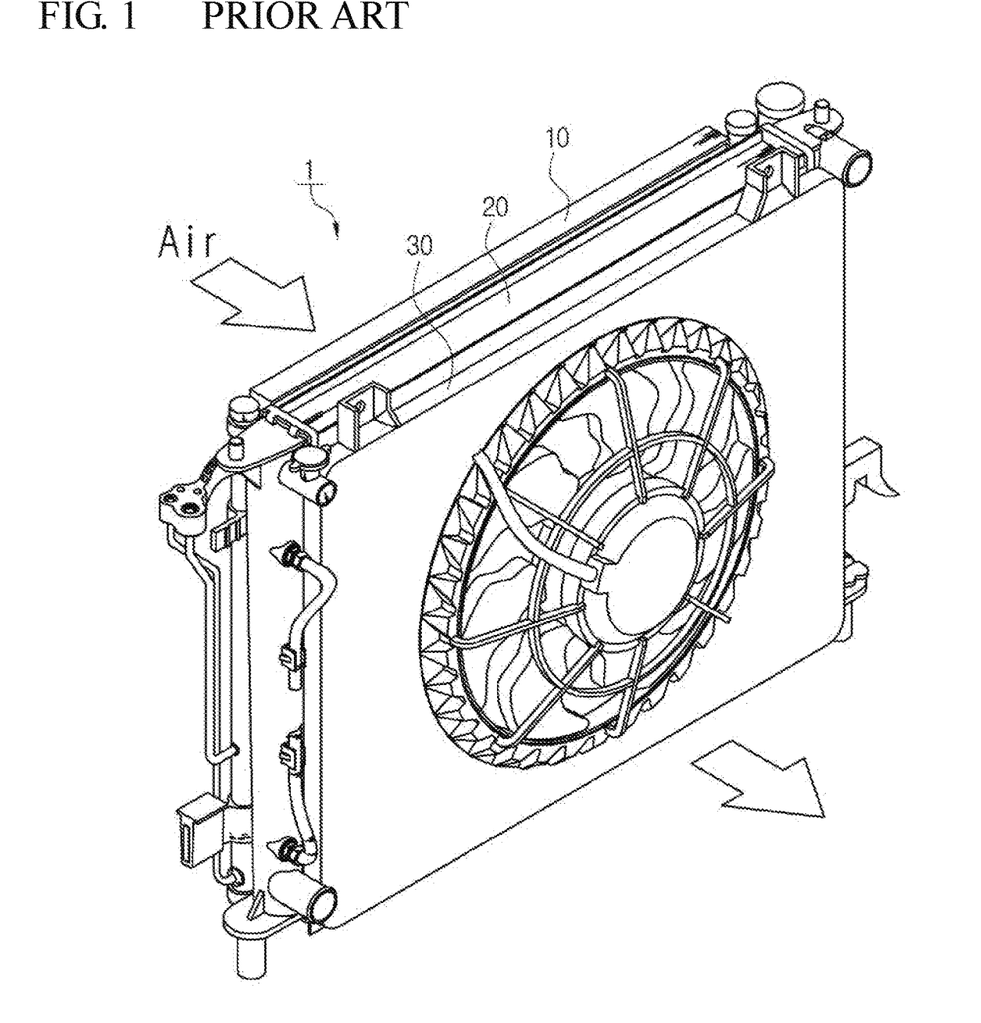
FIG. 1 is a perspective view illustrating a cooling module according to the related art.

The cooling module 1 is formed by sequentially stacking a condenser 10, an engine radiator 20, and a fan shroud assembly 30 as illustrated in FIG. 1, and is mounted in a carrier of the vehicle. The cooling module is mounted in the vehicle by a mounting pin mainly formed at a header tank of the radiator having large rigidity in the cooling module, and cooling air passes through the condenser and the engine radiator and then passes through the fan shroud assembly.

Figure 2:
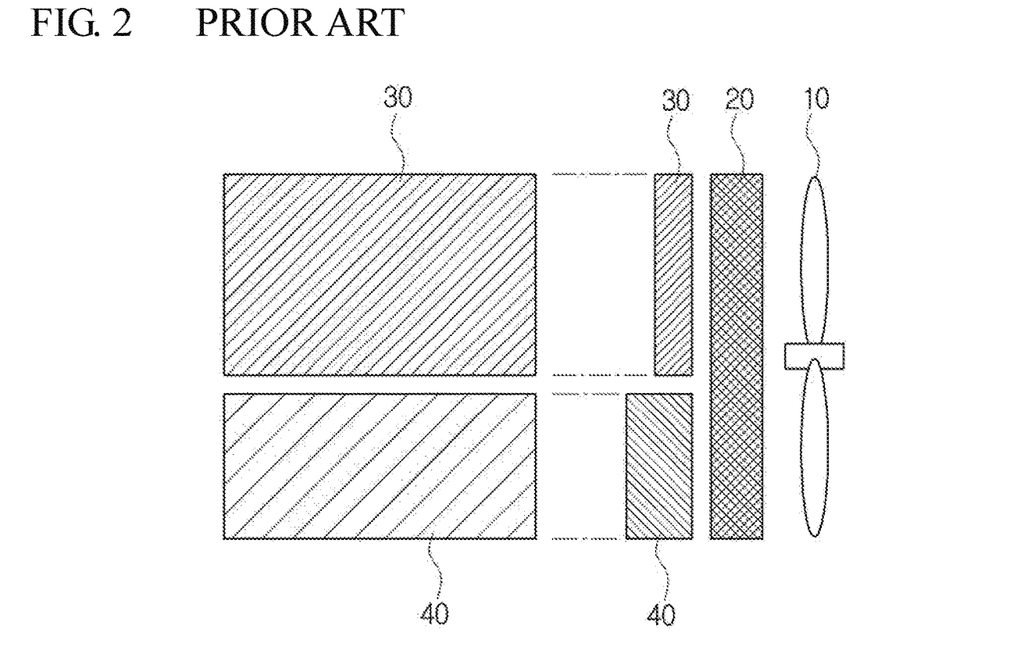
FIG. 2 is a schematic cross-sectional view illustrating a cooling module including an electronic radiator according to the related art.
Figure 3:
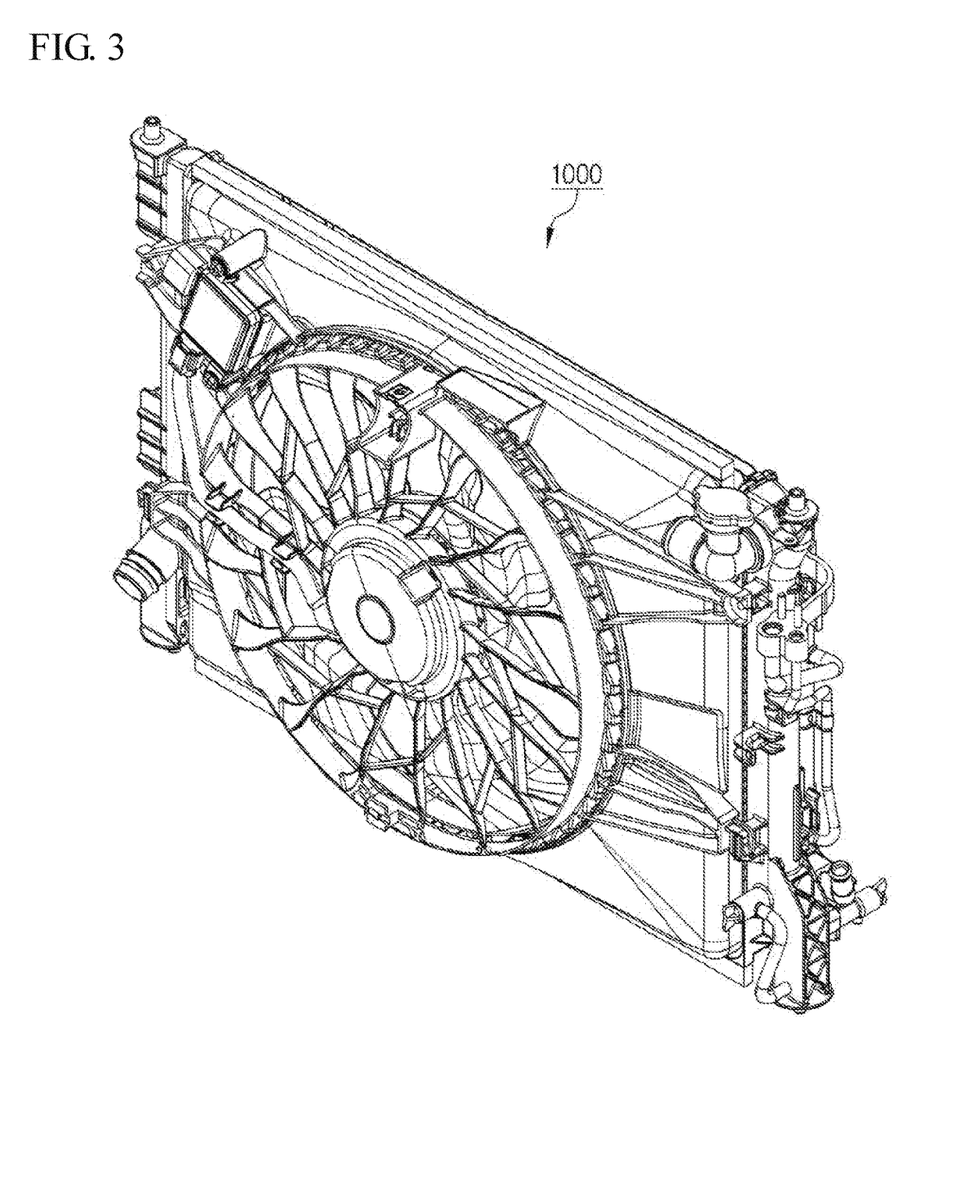
FIGS. 3 to 6 are, respectively, an assembled perspective view, an exploded perspective view, a partially assembled perspective view, and a schematic cross-sectional view illustrating a cooling module according to the present invention.
Figure 4:
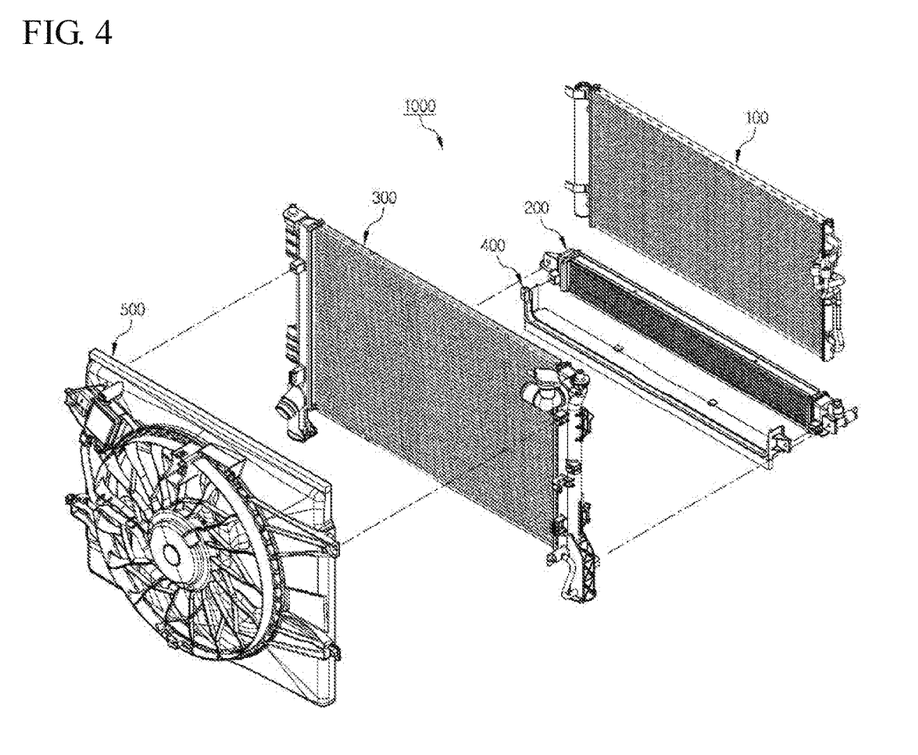
Figure 5:
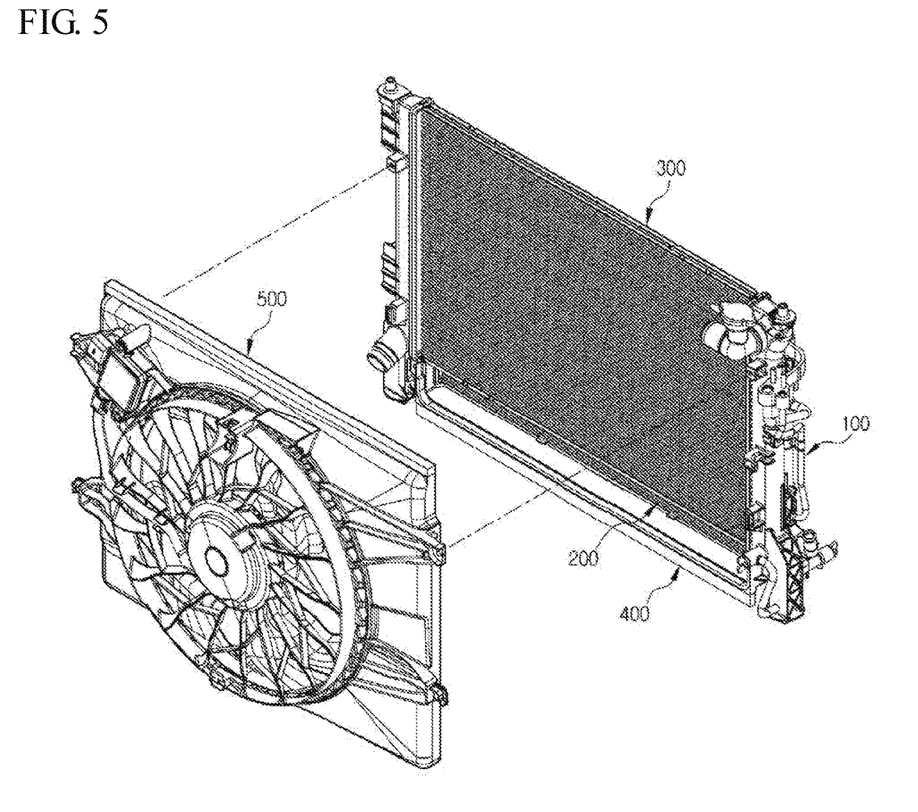

In addition, an electronic radiator 40 as illustrated in FIG. 2 is provided in an electric vehicle, a hybrid vehicle, a fuel cell vehicle, and the like, in order to cool electronic components such as a driving motor, and the like. The condenser 10 and the electronic radiator 40 are disposed at an upper portion and a lower portion at one side of the engine radiator 20.

Since the electronic components as described above generate a very larger amount of heat as compared with a vehicle having an internal combustion engine, they require a high level of cooling performance. However, resistance is generated in cooling air passing through the electronic radiator 40 due to the engine radiator 20 disposed behind the electronic radiator 40 in a flow direction of the cooling air, such that cooling performance of the electronic radiator 40 is deteriorated. Therefore, there is a need to improve the cooling performance of the electronic radiator by allowing the cooling air to smoothly pass through the electronic radiator.

RELATED ART DOCUMENT

Patent Document

1) KR 10-2013-0074041 A (2013.07.04)
2) KR 10-2011-0056598 A (2011.05.31)

Technical Problem

An object of the present invention is to provide a cooling module formed by stacking a condenser mounted in order to cool an engine of a vehicle and cool a refrigerant of an air conditioner, an electronic radiator disposed below the condenser, an engine radiator, and a fan shroud assembly and capable of improving cooling performance of the electronic radiator by forming the engine radiator in only a region in which the condenser is formed or forming the engine radiator in a portion of a region in which the electronic radiator is formed as well as the region in which the condenser is formed, in a height direction and including an air guide installed at a portion corresponding to the electronic radiator below the engine radiator to allow air to be introduced toward the electronic radiator.

TECHNICAL SOLUTION

In one general aspect, a cooling module 1000 includes: a condenser 100; an electronic radiator 200 provided below the condenser 100; an engine radiator 300 provided at one side of the condenser 100 in a flow direction of cooling air; an air guide 400 provided below the engine radiator 300 and at one side of the electronic radiator 200 in the flow direction of the cooling air; and a fan shroud assembly 500 provided at one side of the engine radiator 300 and the air guide 400 in the flow direction of the cooling air, wherein the air guide 400 is disposed between the electronic radiator 200 and the fan shroud assembly 500.

The air guide 400 may be separately formed and be coupled to the electronic radiator 200.

The air guide 400 may be separately formed and be coupled to the fan shroud assembly 500.

The air guide 400 may be formed integrally with the fan shroud assembly 500.

The engine radiator 300 may be formed in a region in which the condenser 100 is formed, and the air guide 400 may be formed in a region in which the electronic radiator 200 is formed, such that the engine radiator 300 and the electronic radiator 200 are not overlapped with each other in a height direction.

The engine radiator 300 may be formed in a region in which the condenser 100 is formed, and the air guide 400 may be formed in a region in which the electronic radiator 200 is formed, such that the electronic radiator 200 and the engine radiator 300 are not overlapped with each other in the flow direction of the cooling air.

The engine radiator 300 may be formed in a region in which the condenser 100 is formed and in some of a region in which the electronic radiator 200 is formed, and the air guide 400 may be formed in the remainder of the region in which the electronic radiator 200 is formed, such that the electronic radiator 200 and the engine radiator 300 are partially overlapped with each other in a height direction.

The engine radiator 300 may be formed in the region in which the condenser 100 is formed, and the air guide 400 may be formed in the region in which the electronic radiator 200 is formed, such that the electronic radiator 200 and the engine radiator 300 are not overlapped with each other in the flow direction of the cooling air.

The engine radiator 300 may be formed in a region in which the condenser 100 is formed, and the air guide 400 may be formed in a region in which the electronic radiator 200 is formed, such that the electronic radiator 200 and the engine radiator 300 are partially overlapped with each other in the flow direction of the cooling air.

The air guide 400 may include a horizontal part 410 and vertical parts 420 formed in a vertical upward direction at both ends of the horizontal part 410, and catching protrusions 411 may be formed at the horizontal part 410, through-holes 431 may be formed in the vertical parts 420, coupling holes 201 into which the catching protrusions 411 are inserted and coupled may be formed in a lower side of the electronic radiator 200, and fastening holes 212 to which separate fastening means 470 passing through the through-holes 431 are coupled may be formed in both sides of the electronic radiator 200 in a length direction.

Rotation preventing parts 450 may be formed on the vertical parts 420, the rotation preventing parts 450 being coupled to the electronic radiator 200.

A protrusion part 211 having a polygonal shape may be formed at the electronic radiator 200, and the rotation preventing parts 450 may protrude from the vertical part 420 and be formed in a pair to be spaced apart from each other on the basis of the through-hole 431, such that the protrusion part 211 is inserted and coupled between the rotation preventing parts 450.

The air guide 400 may include: a horizontal part 410; vertical parts 420 formed in a vertical upward direction at both ends of the horizontal part 410; fixing brackets 430 formed outside the vertical parts 420 in a length direction; and reinforcing parts 440 formed to connect the vertical parts 420 and the fixing brackets 430 to each other.

The air guide 400 may have a reinforcing rib 460 formed downwardly at end portions of the horizontal part 410.

ADVANTAGEOUS EFFECTS

In the cooling module according to the present invention, the cooling air is introduced into the electronic radiator and then passes through the electronic radiator by the air guide, the cooling performance of the electronic radiator may be improved.

In addition, since the air guide may be coupled to the electronic radiator, attachment and detachment of the fan shroud assembly are easy, such that maintenance is easy.

Further, the rotation preventing parts are formed at coupled parts of the air guide coupled to the electronic radiator, thereby making it possible to prevent the air guide from being twisted, deformed, and erroneously assembled at the time of being assembled.

DESCRIPTION OF AN EMBODIMENT OF THE INVENTION

Hereinafter, a cooling module according to the present invention having the configuration as described above will be described in detail with reference to the accompanying drawings.

Figure 6:
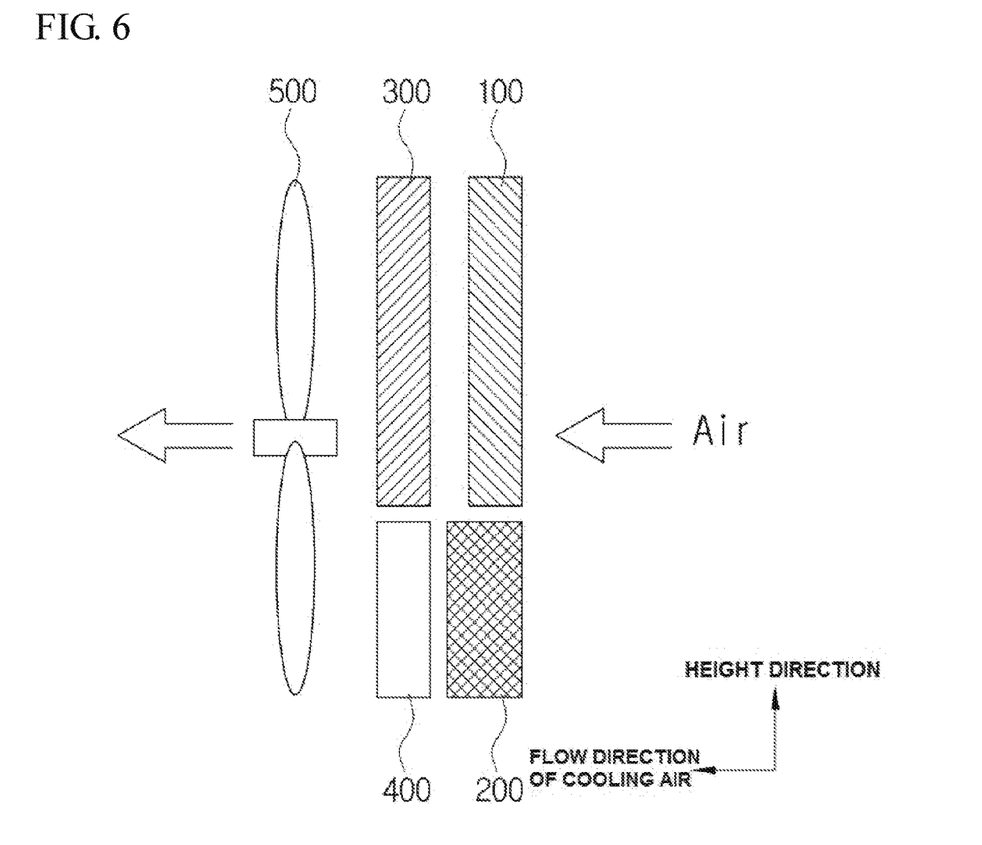
Figure 7:
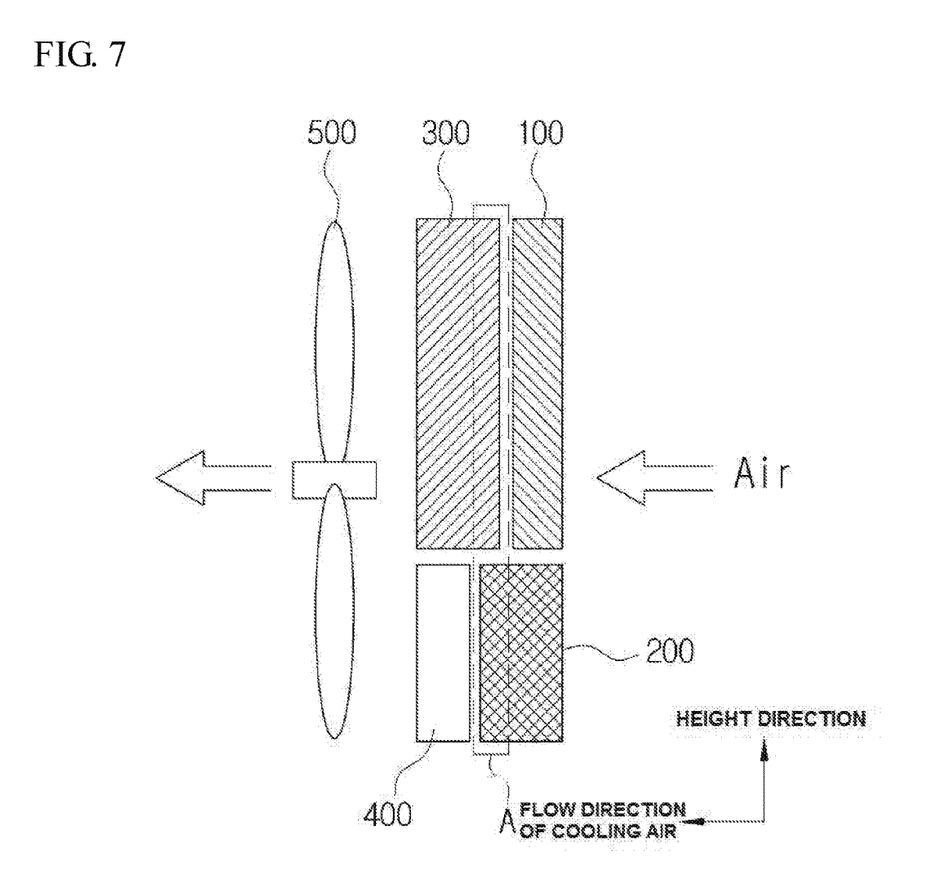
FIGS. 7 and 8 are schematic cross-sectional views illustrating exemplary embodiments of layouts of an electronic radiator, an engine radiator, and an air guide in the cooling module according to the present invention.
Figure 8:
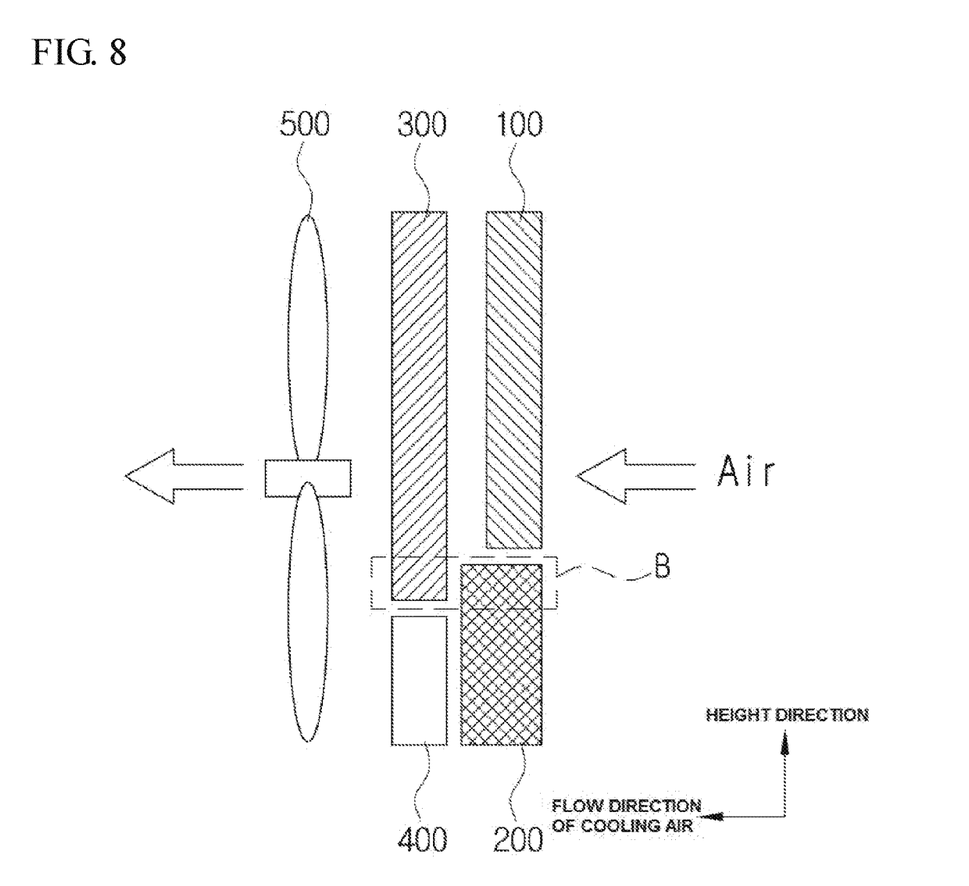

FIGS. 3 to 6 are, respectively, an assembled perspective view, an exploded perspective view, a partially assembled perspective view, and a schematic cross-sectional view illustrating a cooling module according to the present invention, and FIGS. 7 and 8 are, respectively, an exploded perspective view and an assembled perspective view illustrating the electronic radiator and the air guide according to the present invention.

As illustrated, the cooling module 1000 according to the present invention is configured to include a condenser 100; an electronic radiator 200 provided below the condenser 100; an engine radiator 300 provided at one side of the condenser 100 in a flow direction of cooling air; an air guide 400 provided below the engine radiator 300 and at one side of the electronic radiator 200 in the flow direction of the cooling air; and a fan shroud assembly 500 provided at one side of the engine radiator 300 and the air guide 400 in the flow direction of the cooling air, wherein the air guide 400 may be disposed between the electronic radiator 200 and the fan shroud assembly 500.

First, the cooling module 1000 may be configured to mainly include the condenser 100, the electronic radiator 200, the engine radiator 300, the air guide 400, and the fan shroud assembly 500. In addition, the condenser 100, the engine radiator 300, and the fan shroud assembly 500 are stacked in parallel with each other in the flow direction of the cooling air, the electronic radiator 200 is disposed below the condenser 100, and the air guide 400 is disposed below the engine radiator 300. Therefore, the condenser 100 and the electronic radiator 200 form a first row in the flow direction of the cooling air, the engine radiator 300 and the air guide 400 form a second row in the flow direction of the cooling air, and the fan shroud assembly 500 forms a third row in the flow direction of the cooling air. Here, the air guide 400 is disposed behind the electronic radiator 200 in the flow direction of the cooling air, such that the air guide 400 may be disposed between the electronic radiator 200 and the fan shroud assembly 500.

Therefore, the cooling air is introduced into the condenser 100 and the electronic radiator 200 disposed at an introduction side of the cooling air, which is the front of a vehicle, the cooling air passing through the condenser 100 passes through the engine radiator 300 and is then discharged to an engine room through the fan shroud assembly 500, and the cooling air passing through the electronic radiator 200 passes through the air guide 400 and is then discharged to the engine room through the fan shroud assembly 500. Here, since a phenomenon that the cooling air is introduced into the fan shroud assembly 500 without passing through the electronic radiator 200 is prevented by the air guide 400 disposed between the electronic radiator 200 and the fan shroud assembly 500, cooling performance of the electronic radiator 200 may be improved.

Therefore, in the cooling module according to the present invention, the cooling air is introduced into the electronic radiator and then passes through the electronic radiator by the air guide, the cooling performance of the electronic radiator may be improved.

In addition, the air guide 400 may be separately formed and be coupled to the electronic radiator 200. Here, the air guide 400 may be coupled to a rear surface of the electronic radiator 200 in the flow direction of the cooling air, and may be separately formed and be coupled to the electronic radiator 200. That is, since the air guide 400 may be separately formed and be coupled to the electronic radiator 200 so as to be attachable to and detachable from the electronic radiator 200, the fan shroud assembly 500 is easily attached to and detached from the engine radiator 300, such that inspection and repair of the cooling module due to a fault, or the like, may be easily performed. That is, since the air guide 400 is coupled to the electronic radiator 200, attachment and detachment of the fan shroud assembly 500 in a height direction are easily performed, such that maintenance is easy.

Here, the electronic radiator 200 may be coupled and fixed to a lower end of the condenser 100, header tank portions of both sides of the condenser 100 in a length direction and header tank portions of both sides of the engine radiator 300 in the length direction may be coupled and fixed to each other, and both sides of the fan shroud assembly 500 in the length direction may be coupled and fixed to the header tank portions of the engine radiator 300.

In addition, the air guide 400 may be separately formed and be coupled to the fan shroud assembly 500. Therefore, after the air guide 400 is assembled to the fan shroud assembly 500, the fan shroud assembly 500 may be assembled to the engine radiator 300. Here, the air guide 400 may be coupled to a front surface of the fan shroud assembly 500 in the flow direction of the cooling air.

In addition, the air guide 400 may be formed integrally with the fan shroud assembly 500. That is, since a shroud formed in a rectangular shape in the fan shroud assembly 500 is generally formed of an injection-molding product made of plastic, the shroud and the air guide 400 are formed integrally with each other through injection-molding, or the like, such that the air guide 400 and the fan shroud assembly 500 may be formed integrally with each other. Therefore, a structure for coupling the air guide 400 and the fan shroud assembly 500 to each other is not required, such that a configuration may become simple.

In addition, the engine radiator 300 is formed in a region in which the condenser 100 is formed, and the air guide 400 is formed in a region in which the electronic radiator 200 is formed, such that the engine radiator 300 and the electronic radiator 200 may not be overlapped with each other in the height direction.

That is, as illustrated in FIG. 6, the engine radiator 300 is formed in only the region in which the condenser 100 is formed, and the air guide 400 is formed in the region in which the electronic radiator 200 is formed, in the height direction, such that the entire cooling air passing through the electronic radiator 200 passes through the air guide 400 and is then discharged through the fan shroud assembly 500. Therefore, the cooling performance of the electronic radiator 200 may be improved. In addition, the air guide 400 may be attached to and detached from the electronic radiator 200 in a direction in which the air guide 400 and the electronic radiator 200 are arranged, such that the air guide 400 may be easily disassembled and assembled.

In addition, the engine radiator 300 is formed in the region in which the condenser 100 is formed, and the air guide 400 is formed in the region in which the electronic radiator 200 is formed, such that the electronic radiator 200 and the engine radiator 300 may not be overlapped with each other in the flow direction of the cooling air.

In addition, the engine radiator 300 is formed in the region in which the condenser 100 is formed and in some of the region in which the electronic radiator 200 is formed, and the air guide 400 is formed in the remainder of the region in which the electronic radiator 200 is formed, such that the electronic radiator 200 and the engine radiator 300 may be partially overlapped with each other in the height direction.

That is, as illustrated in FIG. 8, the engine radiator 300 is formed in the region in which the condenser 100 is formed and is also formed in some of an upper side of the region in which the electronic radiator 200 is formed, in the height direction, such that a lower side of the engine radiator 300 and an upper side of the electronic radiator 200 may be overlapped with each other (in a region B) in the height direction.

Therefore, cooling performance of the engine radiator 300 may be improved, and in the case in which a small amount of heat is generated in electronic components, such that cooling performance required for cooling the electronic radiator 200 is less required, some of the cooling air passing through the electronic radiator 200 may be heat-exchanged while passing through some of the region of the engine radiator 300 formed to be overlapped with the electronic radiator 200, such that performance of the engine radiator 300 may be secured.

Here, the engine radiator 300 is formed in the region in which the condenser 100 is formed, and the air guide 400 is formed in the region in which the electronic radiator 200 is formed, such that the electronic radiator 200 and the engine radiator 300 may not be overlapped with each other in the flow direction of the cooling air.

In addition, the engine radiator 300 is formed in the region in which the condenser 100 is formed, and the air guide 400 is formed in the region in which the electronic radiator 200 is formed, such that the electronic radiator 200 and the engine radiator 300 may be partially overlapped with each other in the flow direction of the cooling air.

That is, since the electronic radiator 200 is formed at a short length in the height direction and is disposed below the condenser 100, the electronic radiator 200 may be formed at a width (a thickness) thicker than a width of the condenser 100 in order to secure the cooling performance, as illustrated in FIG. 7. Therefore, the electronic radiator 200 and the engine radiator 300 are disposed to be partially overlapped with each other (in a region A) in the flow direction (a width direction) of the cooling air, and a width of the air guide 400 is decreased while maintaining a width of the engine radiator 300, thereby making it possible to maintain the entire width of the cooling module, and the engine radiator 300 is formed at a thick width while maintaining the width of the air guide 400, thereby making it possible to improve cooling performance of the engine radiator 300.

In addition, the air guide 400 includes a horizontal part 410 and vertical parts 420 formed in a vertical upward direction at both ends of the horizontal part 410, and catching protrusions 411 are formed at the horizontal part 410, through-holes 431 are formed in the vertical parts 420, coupling holes 201 into which the catching protrusions 411 are inserted and coupled are formed in a lower side of the electronic radiator 200, and fastening holes 212 to which separate fastening means 470 passing through the through-holes 431 are coupled may be formed in both sides of the electronic radiator 200 in the length direction.

Figure 9:
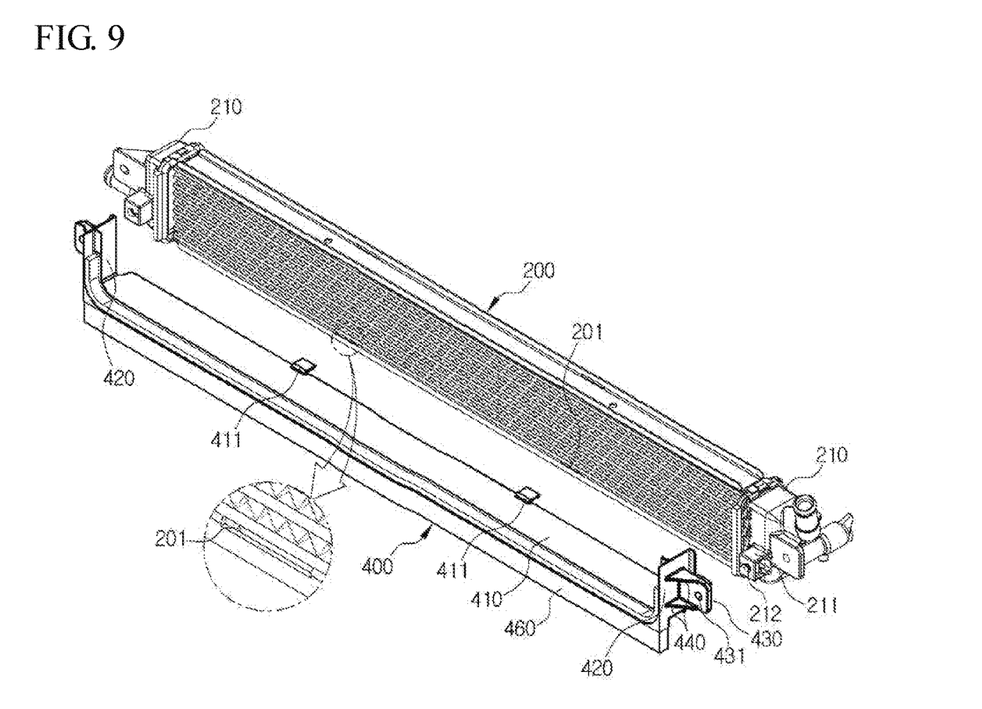
FIGS. 9 and 10 are, respectively, an exploded perspective view and an assembled perspective view illustrating the electronic radiator and the air guide according to the present invention.
Figure 10:
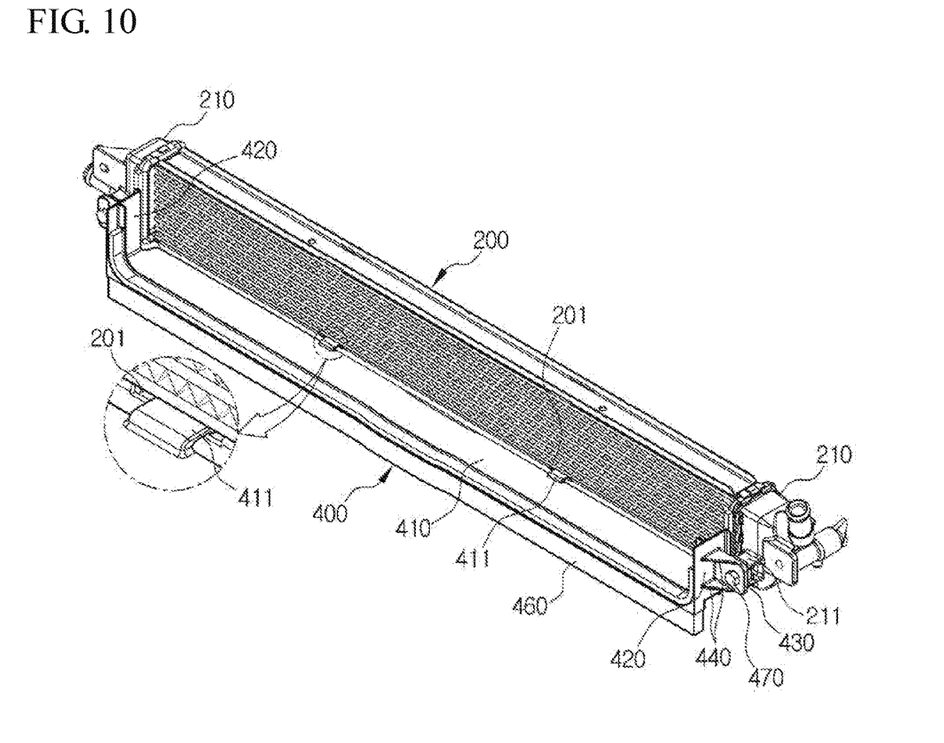
Figure 12:
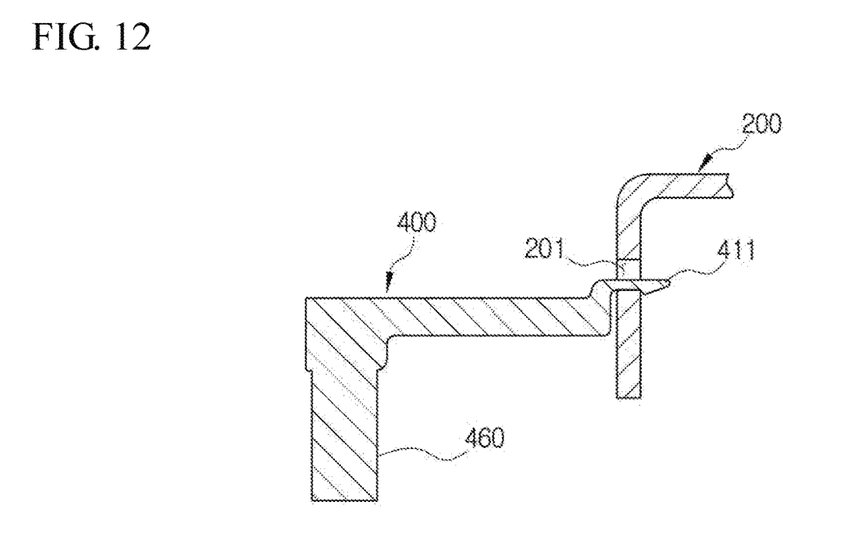
FIG. 12 is an assembled fragmentary cross-sectional view illustrating a fitting-coupling structure of the electronic radiator and the air guide according to the present invention.

That is, since the engine radiator 300 is disposed above the air guide 400, the air guide 400 may have a form in which the vertical parts 420 are formed in the vertical upward direction at both ends of the horizontal part 410 so as to close the lower side of the electronic radiator 200 and both sides of the electronic radiator 200 in the length direction, as illustrated in FIGS. 7, 9, and 10. In addition, as illustrated in FIG. 12, the catching protrusions 411 formed at the horizontal part 410 are formed to be inserted into the coupling holes 201 formed in the electronic radiator 200, such that the catching protrusions 411 may be firmly fixed without being withdrawn in an opposite direction to a direction in which they are inserted into the coupling holes 210 in a state in which they are inserted into the coupling holes 201 by fitting-coupling. Further, the through-holes 431 are formed in the vertical parts 420. More specifically, the through-holes 431 may be formed in fixing brackets 430 having a form in which they are bent outwardly from the vertical parts 420, protrusion parts 211 may be formed at header tanks 210 formed at both sides of the electronic radiator 200 in the length direction, and the fastening holes 212 may be formed in the protrusion parts 211. Therefore, the separate fastening means 470 such as a bolt may pass through the through-holes 431 and be then coupled to the fastening holes 212. As described above, the air guide 400 may be coupled to the electronic radiator 200, the horizontal part 410 of the air guide 400 may be fitted into the electronic radiator 200, and the vertical parts 420 of the air guide 400 may be fastened and firmly coupled to the electronic radiator 200 by the bolt, or the like.

In addition, rotation preventing parts 450 may be formed on the vertical parts 420. The rotation preventing parts 450 may be coupled to the electronic radiator 200.

Figure 11:
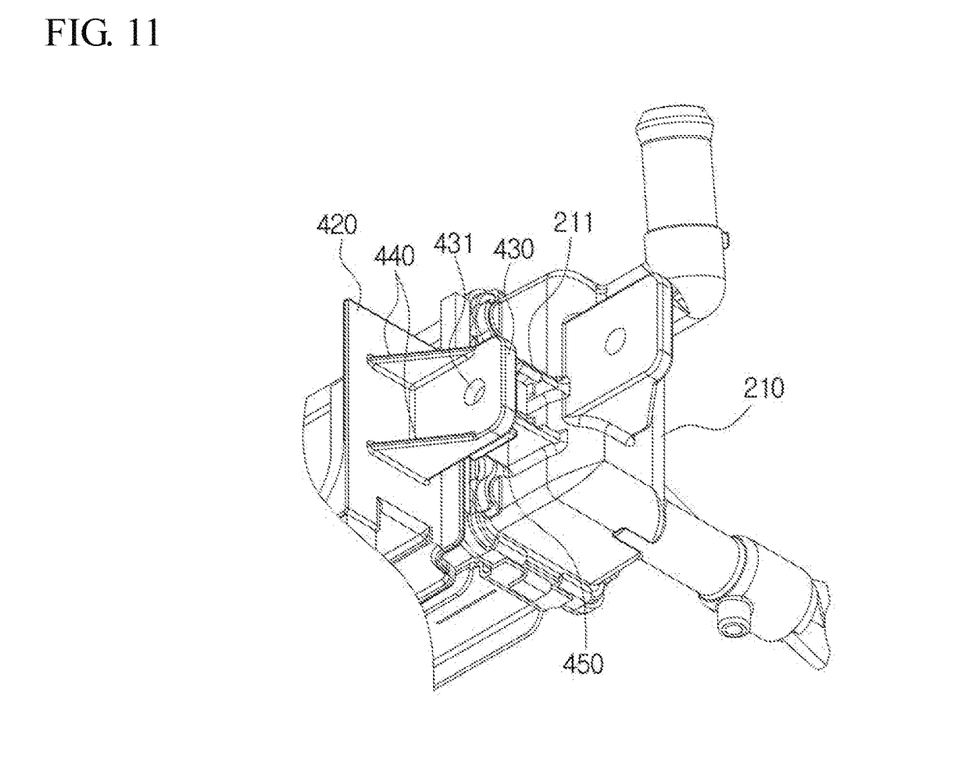
FIG. 11 is an assembled fragmentary perspective view illustrating a fastening structure of the electronic radiator and the air guide according to the present invention.
Figure 13:
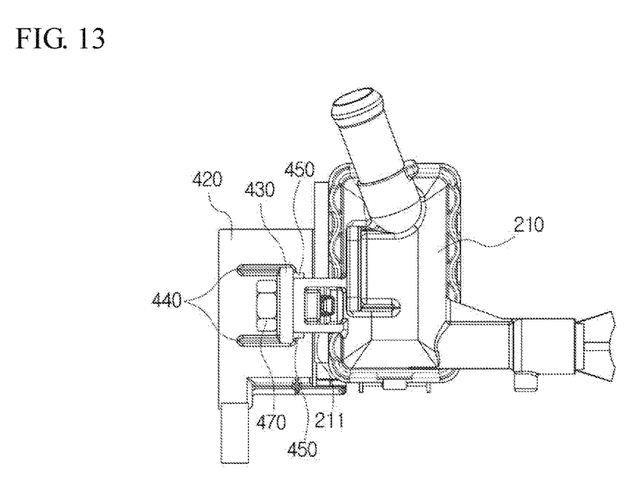
FIG. 13 is a side view illustrating a rotation preventing structure in a fastening part of the electronic radiator and the air guide according to the present invention.

That is, as illustrated in FIGS. 11 and 13, the rotation preventing parts 450 are formed in a form in which they protrude on one surfaces of the fixing brackets 430 formed on the vertical parts 420 of the air guide 400 and are coupled to the protrusion parts 211 protruding at the head tanks 210 of the electronic radiator 200 so as not to rotate, thereby making it possible to prevent the air guide from being deformed and bent or from being deviated from a position at which the air guide is closely adhered and is fixed to the electronic radiator due to rotation and frictional force of the bolt at the time of fastening the air guide to the electronic radiator using the bolt, or the like. Here, since the horizontal part 410 of the air guide 400 is formed at a length relatively very longer than that of the vertical parts 420 of the air guide 400, the horizontal part 410 may be deformed at the time of performing coupling by fastening of the vertical parts 420. However, due to the rotation preventing parts 450 formed on the vertical parts 420, the horizontal part 410 and the vertical parts 420 may be closely adhered and be fixed to the electronic radiator 200 at desired positions and deformation of the air guide 400 due to warpage of the air guide 400 may also be prevented.

In addition, a protrusion part 211 having a polygonal shape is formed at the electronic radiator 200, and the rotation preventing parts 450 protrude from the vertical part 420 and are formed in a pair to be spaced apart from each other on the basis of the through-hole 431, such that the protrusion part 211 may be inserted and coupled between the rotation preventing parts 450.

That is, the protrusion part 211, more specifically, the protrusion part 211 having a polygonal shape such as a quadrangular pillar shape, or the like, is formed at the header tank 210 of the electronic radiator 200, and the air guide 400 includes the rotation preventing parts 450 protruding at the fixing bracket 430 extended from the vertical part 420. Here, the pair of rotation preventing parts 450 are formed to be spaced apart from each other on the basis of the through-hole 431 through which the fastening means 470 penetrates, and the protrusion part 211 having a quadrangular pillar shape may be inserted and coupled between the pair of rotation preventing parts 450. Therefore, since planes of the protrusion part 211 are closely adhered to the pair of rotation preventing parts 450, rotation of the air guide may be prevented in a state in which the protrusion part 211 is inserted and coupled between the pair of rotation preventing parts 450, such that when the vertical parts 420 are coupled to the electronic radiator 200 using the fastening means 470 such as the bolt, or the like, warpage, twisting, coupling position deviation, and the like, of the vertical parts 420 and the horizontal part 410 connected to the vertical part 420 may be prevented.

In addition, the rotation preventing parts 450 are formed of pins protruding at positions spaced apart from the through-hole 431, insertion holes are formed at positions corresponding to the pins in the protrusion part 211, and the pins are inserted and coupled into the insertion holes, thereby making it possible to prevent the rotation of the air guide at the time of fastening the air guide to the electronic radiator using the bolt. Further, the rotation preventing parts 450 and the protrusion part 211 may be formed in various forms.

In addition, the air guide 400 may include a horizontal part 410, vertical parts 420 formed in the vertical upward direction at both ends of the horizontal part 410, fixing brackets 430 formed outside the vertical parts 420 in the length direction, and reinforcing parts 440 formed to connect the vertical parts 420 and the fixing brackets 430 to each other.

That is, as illustrated, the through-holes may be directly formed in the vertical parts 420 of the air guide 400 and be coupled to the fastening holes 212 formed in the header tanks 210 of the electronic radiator 200 by the fastening means 470. Alternatively, the fixing brackets 430 having a bent form may be formed outside the vertical parts 420 in the length direction and the through-holes 431 may be formed in the fixing bracket 430 so that the fastening means 470 may be fastened in directions in which the air guide 400 is attached to and detached from the electronic radiator 200. In addition, the reinforcing parts 440 connecting the vertical parts 420 and the fixing brackets 430 to each other may be formed in order to improve structural rigidity of the vertical parts 420 and the fixing brackets 430.

In addition, the air guide 400 may have a reinforcing rib 460 formed downwardly at end portions of the horizontal part 410.

That is, since the horizontal part 410 may be formed to be elongated in the length direction and may be formed in a plate shape, the reinforcing rib 460 having a form in which it is bent downwardly of the horizontal part 410 may be formed over the entirety of the horizontal part 410 in the length direction in order to prevent deformation of the horizontal part due to the fastening, deformation of the horizontal part at the time of manufacturing through injection-molding, and deformation of the horizontal part due to pressure of the cooling air. Here, the reinforcing rib 460 may be formed at the end portions of the horizontal part 410 adjacent to the fan shroud assembly 500, and a reinforcing part connecting the horizontal part 410 and the reinforcing rib 460 to each other may be further formed.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

1000: cooling module
100: condenser
200: electronic radiator
201: coupling hole
210: header tank
211: protrusion part
212: fastening hole
300: engine radiator
400: air guide
410: horizontal part
411: catching protrusion
420: vertical part
430: fixing bracket
431: through-hole
440: reinforcing part
450: rotation preventing part
460: reinforcing rib
470: fastening means
500: fan shroud assembly

The invention claimed is:

1. A cooling module comprising:
a condenser 100;
an electronic radiator 200 provided below the condenser 100;
an engine radiator 300 provided at one side of the condenser 100 in a flow direction of a cooling air;
an air guide 400 provided below the engine radiator 300 and at one side of the electronic radiator 200 in the flow direction of the cooling air; and
a fan shroud assembly 500 provided at one side of the engine radiator 300 and the air guide 400 in the flow direction of the cooling air,
wherein the air guide 400 is disposed between the electronic radiator 200 and the fan shroud assembly 500.

2. The cooling module of claim 1, wherein the air guide 400 is separately formed and is coupled to the electronic radiator 200.

3. The cooling module of claim 1, wherein the air guide 400 is separately formed and is coupled to the fan shroud assembly 500.

4. The cooling module of claim 1, wherein the air guide 400 is formed integrally with the fan shroud assembly 500.

5. The cooling module of claim 1, wherein the engine radiator 300 is formed in a region in which the condenser 100 is formed, and the air guide 400 is formed in a region in which the electronic radiator 200 is formed, such that the electronic radiator 200 and the engine radiator 300 are not overlapped with each other in a height direction.

6. The cooling module of claim 1, wherein the engine radiator 300 is formed in a region in which the condenser 100 is formed, and the air guide 400 is formed in a region in which the electronic radiator 200 is formed, such that the electronic radiator 200 and the engine radiator 300 are not overlapped with each other in the flow direction of the cooling air.

7. The cooling module of claim 1, wherein the engine radiator 300 is formed in a region in which the condenser 100 is formed and in some of a region in which the electronic radiator 200 is formed, and the air guide 400 is formed in a remainder of the region in which the electronic radiator 200 is formed, such that the electronic radiator 200 and the engine radiator 300 are partially overlapped with each other in a height direction.

8. The cooling module of claim 7, wherein the engine radiator 300 is formed in the region in which the condenser 100 is formed, and the air guide 400 is formed in the region in which the electronic radiator 200 is formed, such that the electronic radiator 200 and the engine radiator 300 are not overlapped with each other in the flow direction of the cooling air.

9. The cooling module of claim 1, wherein the engine radiator 300 is formed in a region in which the condenser 100 is formed, and the air guide 400 is formed in a region in which the electronic radiator 200 is formed, such that the electronic radiator 200 and the engine radiator 300 are partially overlapped with each other in the flow direction of the cooling air.

10. The cooling module of claim 1, wherein the air guide 400 includes a horizontal part 410 and vertical parts 420 formed in a vertical upward direction at both ends of the horizontal part 410, and
catching protrusions 411 are formed at the horizontal part 410, through-holes 431 are formed in the vertical parts 420, coupling holes 201 into which the catching protrusions 411 are inserted and coupled are formed in a lower side of the electronic radiator 200, and fastening holes 212 to which separate fastening means 470 passing through the through-holes 431 are coupled are formed in both sides of the electronic radiator 200 in a length direction.

11. The cooling module of claim 10, wherein rotation preventing parts 450 are formed on the vertical parts 420, the rotation preventing parts 450 being coupled to the electronic radiator 200.

12. The cooling module of claim 11, wherein a protrusion part 211 having a polygonal shape is formed at the electronic radiator 200, and the rotation preventing parts 450 protrude from the vertical parts 420 and are formed in a pair to be spaced apart from each other on a basis of the through-holes 431, such that the protrusion part 211 is inserted and coupled between the rotation preventing parts 450.

13. The cooling module of claim 1, wherein the air guide 400 includes:
a horizontal part 410;
vertical parts 420 formed in a vertical upward direction at both ends of the horizontal part 410;
fixing brackets 430 formed outside the vertical parts 420 in a length direction; and reinforcing parts 440 formed to connect the vertical parts 420 and the fixing brackets 430 to each other.

14. The cooling module of claim 13, wherein the air guide 400 includes a reinforcing rib 460 formed downwardly at end portions of the horizontal part 410.

* * * * *